(12) United States Patent
Foote et al.

(10) Patent No.: US 7,490,946 B1
(45) Date of Patent: Feb. 17, 2009

(54) MAIN MIRROR WITH PIVOT CONNECTION

(75) Inventors: Keith D. Foote, Kentwood, MI (US); James A. Ruse, Allegan, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 256 days.

(21) Appl. No.: 11/553,773

(22) Filed: Oct. 27, 2006

Related U.S. Application Data

(60) Provisional application No. 60/596,908, filed on Oct. 28, 2005.

(51) Int. Cl.
G02B 7/182 (2006.01)
B60R 1/06 (2006.01)

(52) U.S. Cl. .............. 359/841; 359/872; 248/478; 248/479

(58) Field of Classification Search ............ 359/841, 359/872; 248/477, 478, 479
See application file for complete search history.

(56) References Cited

U.S. PATENT DOCUMENTS

| | | | |
|---|---|---|---|
| 2,856,816 A | 10/1958 | Ross | |
| 2,903,210 A | 9/1959 | Cousins | |
| 3,189,309 A | 6/1965 | Hager | |
| 3,282,549 A | 11/1966 | Crawford | |
| 3,339,876 A * | 9/1967 | Kampa | 248/478 |
| 3,583,734 A * | 6/1971 | Magi | 403/96 |
| 3,667,718 A | 6/1972 | Goslin et al. | |
| 4,165,156 A | 8/1979 | O'Connell | |
| 4,186,905 A * | 2/1980 | Brudy | 248/478 |
| 4,197,762 A * | 4/1980 | Yamana | 74/502.1 |
| 4,258,894 A | 3/1981 | Niggemann | |
| 4,315,614 A | 2/1982 | Stegenga et al. | |
| 4,558,930 A | 12/1985 | Deedreek | |
| 4,598,982 A | 7/1986 | Levine | |
| 4,605,289 A | 8/1986 | Levine et al. | |
| 4,623,115 A * | 11/1986 | Brester | 248/479 |
| 4,711,538 A | 12/1987 | Ohs et al. | |
| 4,753,410 A | 6/1988 | Dyer | |
| 4,892,400 A | 1/1990 | Brookes et al. | |
| 4,892,401 A | 1/1990 | Kittridge et al. | |
| 4,921,337 A | 5/1990 | Hou | |
| 5,007,724 A | 4/1991 | Hou | |
| 5,096,283 A | 3/1992 | Croteau | |
| 5,110,196 A | 5/1992 | Lang et al. | |
| 5,124,847 A | 6/1992 | Gong | |
| 5,137,247 A * | 8/1992 | Lang et al. | 248/549 |
| 5,210,655 A | 5/1993 | Mishali | |

(Continued)

Primary Examiner—Ricky D Shafer
(74) Attorney, Agent, or Firm—McGarry Bair PC

(57) ABSTRACT

A vehicular exterior rearview mirror system comprises a reflective element assembly, a base frame coupling the reflective element assembly to a vehicle, a support arm for coupling the reflective element assembly to the base frame, and a pivot connection for pivotally coupling the support arm to one of the base frame and the reflective element assembly. The pivot connection comprises a pedestal having at least two detent ribs, and an opening for receipt of the pedestal therethrough having at least two detent channels. Pivoting of one of the support arm relative to the base frame and the reflective element assembly relative to the support arm moves a first one of the at least two detent ribs out of a first one of the at least two detent channels and into a second one of the at least two detent channels.

15 Claims, 24 Drawing Sheets

U.S. PATENT DOCUMENTS

| | | |
|---|---|---|
| 5,225,943 A | 7/1993 | Lupo |
| 5,337,190 A | 8/1994 | Kogita et al. |
| 5,375,014 A | 12/1994 | Fujie et al. |
| 5,546,239 A | 8/1996 | Lewis |
| 5,604,644 A | 2/1997 | Lang et al. |
| 5,969,890 A | 10/1999 | Whitehead |
| 6,022,113 A * | 2/2000 | Stolpe et al. ................. 359/841 |
| 6,024,459 A | 2/2000 | Lewis |
| 6,183,098 B1 * | 2/2001 | Martin ....................... 359/871 |
| 6,286,968 B1 * | 9/2001 | Sailer et al. ................. 359/872 |
| 6,322,221 B1 * | 11/2001 | van de Loo ................. 359/841 |
| 6,439,730 B1 | 8/2002 | Foote et al. |
| 6,505,944 B1 | 1/2003 | Lewis |
| 6,648,481 B2 | 11/2003 | Lewis |
| 6,742,756 B1 * | 6/2004 | Fimeri et al. ................. 248/479 |
| 6,820,987 B1 | 11/2004 | Lewis |
| 6,939,017 B2 | 9/2005 | Lewis |
| 7,137,715 B2 * | 11/2006 | Schuurmans et al. ........ 359/841 |
| 2002/0001148 A1 * | 1/2002 | Fuchs et al. ................. 359/872 |
| 2005/0030652 A1 | 2/2005 | Lewis |

* cited by examiner

MAIN MIRROR WITH PIVOT CONNECTION

CROSS-REFERENCE TO RELATED APPLICATION

This application claims the benefit of U.S. provisional application Ser. No. 60/596,908, filed Oct. 28, 2005, which is incorporated herein in its entirety.

BACKGROUND OF THE INVENTION

1. Field of the Invention

The invention relates generally to rearview mirrors for motor vehicles and more particularly to a pivot connection for a vehicular rearview mirror comprising only two mating elements in a snap-fit relationship.

2. Description of the Related Art

External rearview mirrors are ubiquitous for conventional motor vehicles. Such mirrors are frequently adapted to be adjusted by the vehicle operator at preselected positions. For example, external rearview mirrors can be selectively folded against the vehicle when not in use, and unfolded away from the vehicle for use. The mirrors can also be extended laterally away from the vehicle (the "outboard" position) to adjust the rearward view during towing of a trailer, and retracted toward the vehicle (the "inboard" position) during non-towing operation by rotating the mirror about an axis which is offset from the center point of the reflective element and perpendicular thereto.

Conventional mirrors are typically mounted to a motor vehicle by a base immovably attached to the vehicle which supports in cantilever fashion a support arm to which is attached the reflective element assembly. The support arm is adapted for pivoting relative to the base through a pivot connection. The pivot connection frequently comprises a post extending upwardly from the base and a bearing circumferentially disposed about the post to enable rotation of the bearing relative to the post. A detent assembly may be provided in order to define "stop" positions for the support arm relative to the base, for example folded against the vehicle, partially extended away from the vehicle, and fully extended away from the vehicle. These detents are frequently urged into engagement through a spring. The spring typically encircles the post and is retained thereon with a friction nut or pal nut to enable the spring to bear against the support arm bearing.

While the aforementioned assembly satisfactorily enables pivoting of the reflective element assembly relative to the base, it requires the use of a spring and friction nut, which increases the complexity of the assembly operation, requires additional parts which add cost and weight to the mirror, and may require special tools to assemble. Thus, there is a need for a pivot assembly which it utilizes fewer parts, and is easier to assemble.

SUMMARY OF THE INVENTION

A vehicular exterior rearview mirror system comprises a reflective element assembly for providing an occupant of a vehicle with a rearward view, a base frame for coupling the reflective element assembly to a vehicle, a support arm for coupling the reflective element assembly to the base frame, and a pivot connection for coupling the support arm to one of the base frame and the reflective element assembly for pivotal movement of one of the support arm relative to the base frame and the reflective element assembly relative to the support arm. The pivot connection comprises a pedestal coupled with one of the base frame, the support arm, and the reflective element assembly, and having at least two detent ribs, and an opening in the other of the base frame, the support arm, and the reflective element assembly for receipt of the pedestal therethrough, and having at least two detent channels. Pivoting of one of the support arm relative to the base frame and the reflective element assembly relative to the support arm moves a first one of the at least two detent ribs out of a first one of the at least two detent channels and into a second one of the at least two detent channels to position the one of the support arm and the reflective element assembly into a preselected location relative to the one of the base frame and the support arm, respectively.

DESCRIPTION OF AN EMBODIMENT OF THE INVENTION

Figure 1:
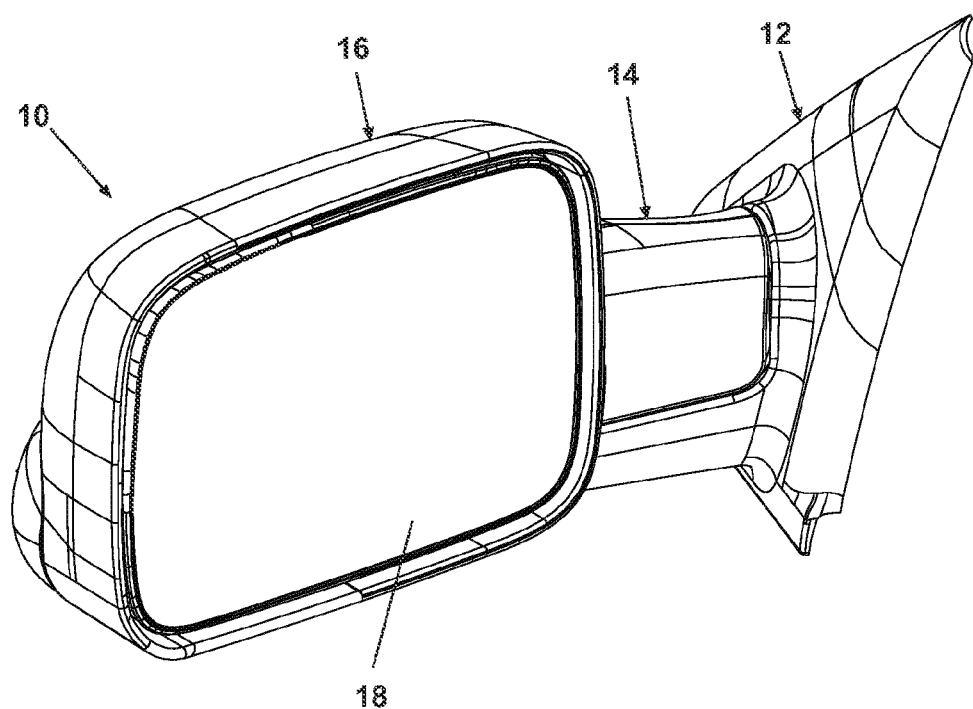
FIG. 1 is a rear perspective view of a motor vehicle mirror system comprising a first embodiment of a pivot assembly according to the invention.

Referring now to the Figures, and in particular to FIG. 1, a first embodiment of an external vehicular mirror system 10 comprising a pivot connection according to the invention is illustrated. The mirror system 10 comprises a base 12 adapted for mounting to the exterior of a motor vehicle, a support arm 14 adapted for pivoting movement relative to the base 12, and a reflective element assembly 16 attached to and supported by the support arm 14. The reflective element assembly 16 comprises a well-known reflective element 18 for providing the driver of the motor vehicle with a rearward view.

Figure 2:
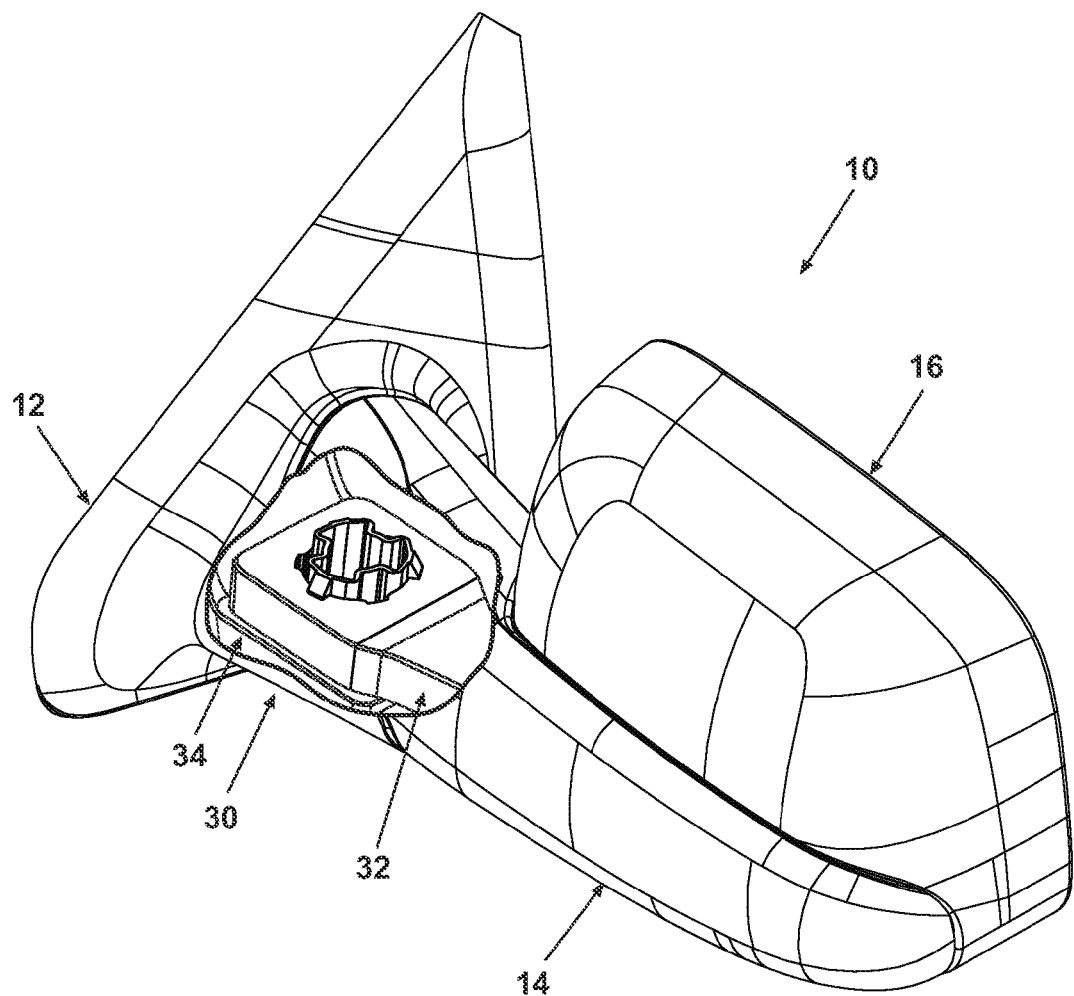
FIG. 2 is a front perspective view of the motor vehicle mirror system illustrated in FIG. 1 showing the pivot assembly, with exterior portions of the mirror system shown in phantom.
Figure 3:
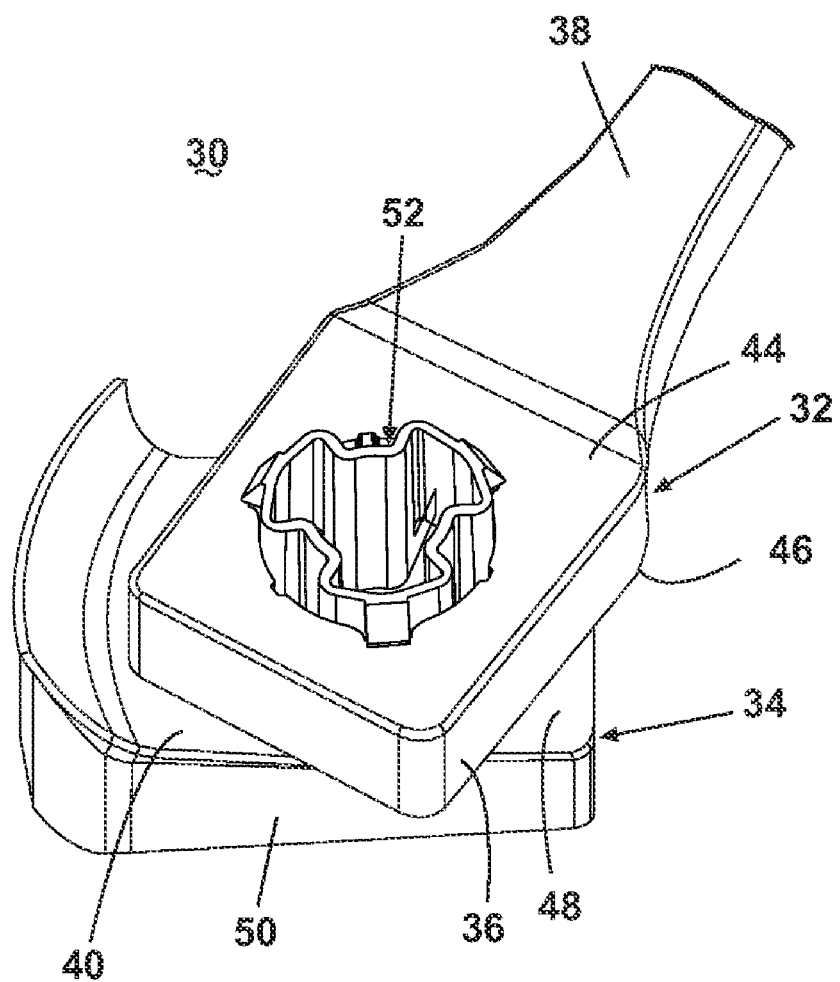
FIG. 3 is an enlarged perspective view of the pivot assembly illustrated in FIG. 2.

FIG. 2 illustrates the external vehicular mirror system 10 with a pivot connection 30 comprising a support arm portion 32 and a base portion 34 in cooperative disposition as hereinafter described. It should be understood that the pivot connection 30 is disposed in the mirror system so that the base portion 34 is immovably attached to or integrated into the base 12, and the support arm portion 32 is attached to or integrated into the support arm 14 to enable pivoting of the support arm 14 relative to the base 12. Referring also to FIG. 3, the support arm portion 32 is illustrated as comprising a rectilinear bearing plate 36 rigidly attached to an elongated, somewhat elliptical attachment arm 38 extending laterally therefrom, and the base portion 34 is illustrated as comprising a rectilinear bearing plate 40 rigidly attached to an elongated, somewhat elliptical attachment post 42 extending laterally therefrom. However, the bearing plates 36, 40, the attachment arm 38, and the attachment post 42 can be provided with other configurations suitable for disposition in the base 12 and the support arm 14, or eliminated by integrating the operational elements of the pivot connection directly into the base 12 and the support arm 14.

Figure 4:
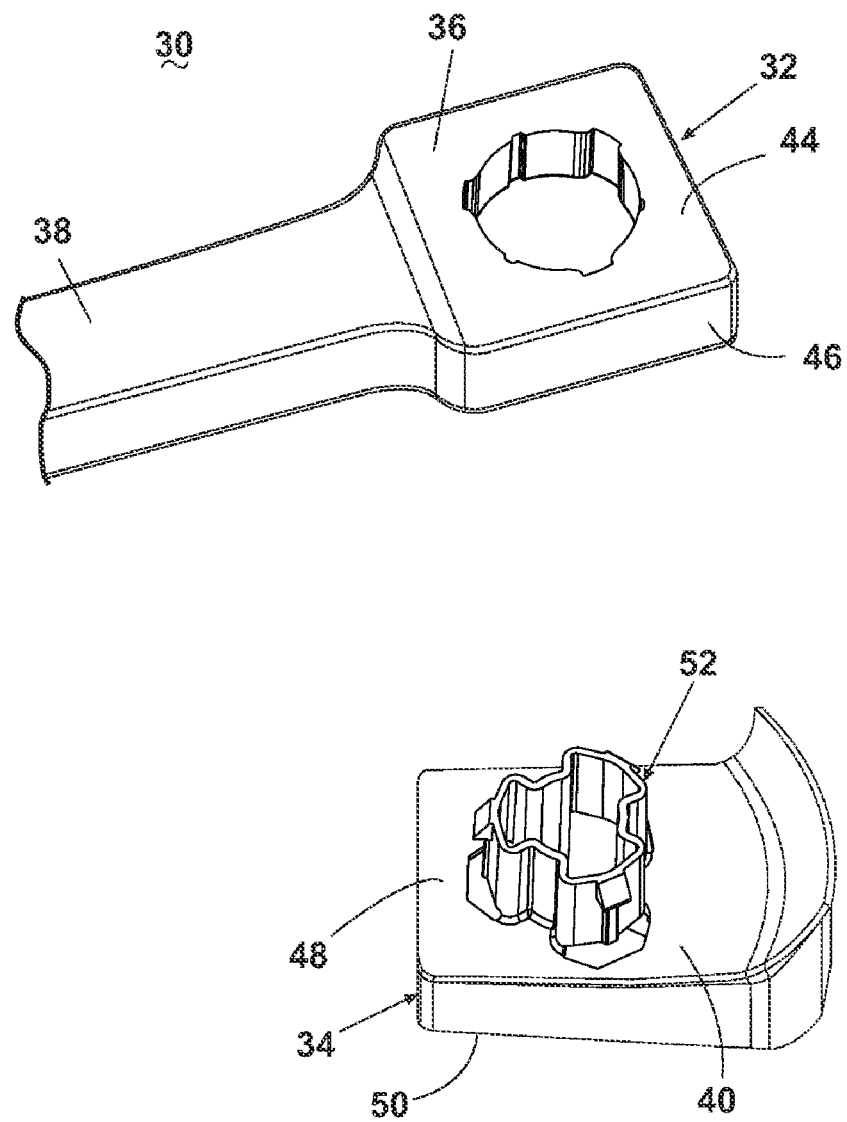
FIG. 4 is an exploded view of the pivot assembly illustrated in FIG. 3 showing a support arm portion and a base portion.

Referring also to FIG. 4, the bearing plate 36 of the support arm portion 32 is provided with a generally planar upper surface 44 and an opposed, generally planar contact surface 46. The bearing plate 40 of the base portion 34 is provided with a generally planar contact surface 48 and an opposed, generally planar lower surface 50. A pivot column 52 comprises a regularly-undulating circumferential wall extending generally orthogonally to the upper surface 48 of the bearing plate 40 and defining an opening 74 therethrough.

Figure 5:
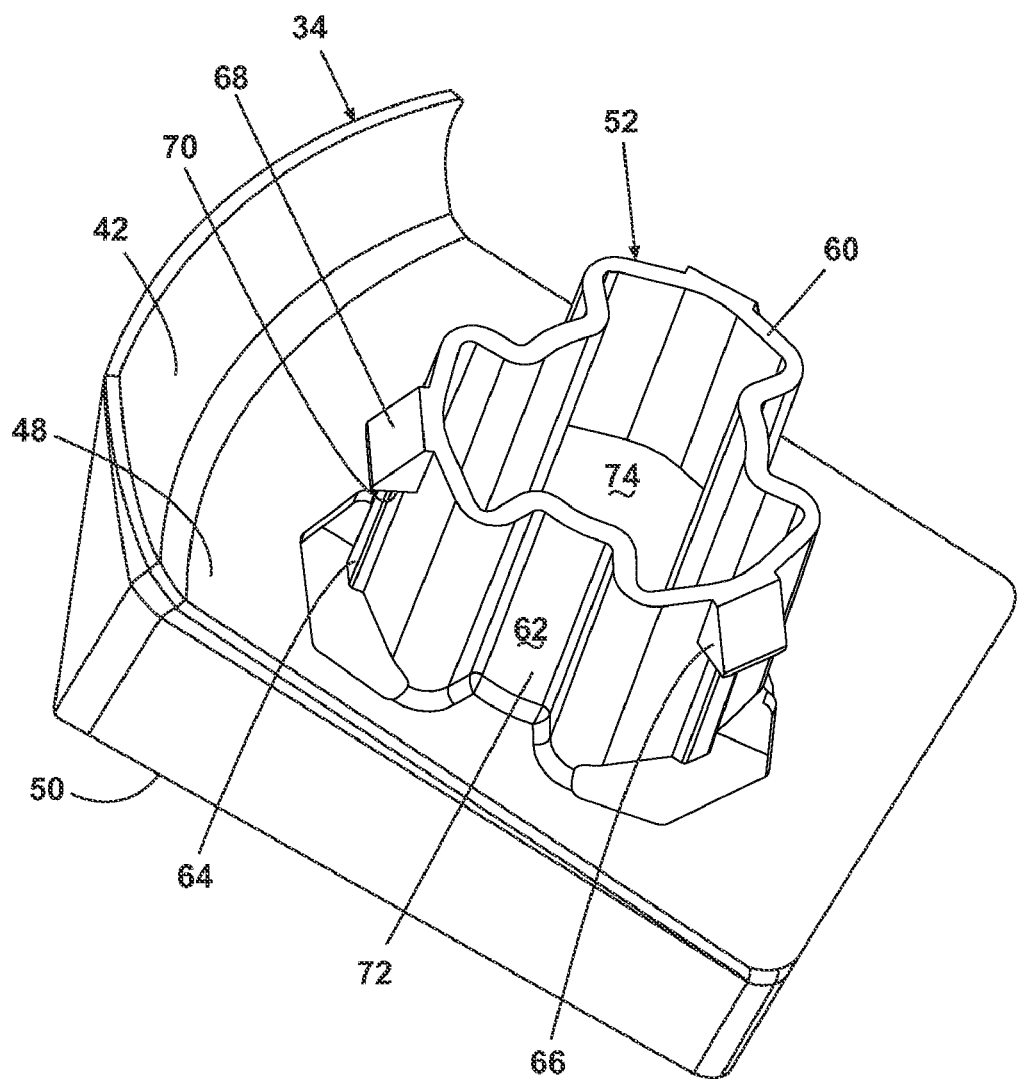
FIG. 5 is an enlarged perspective view of an upper surface of the base portion illustrated in FIG. 4.
Figure 6:
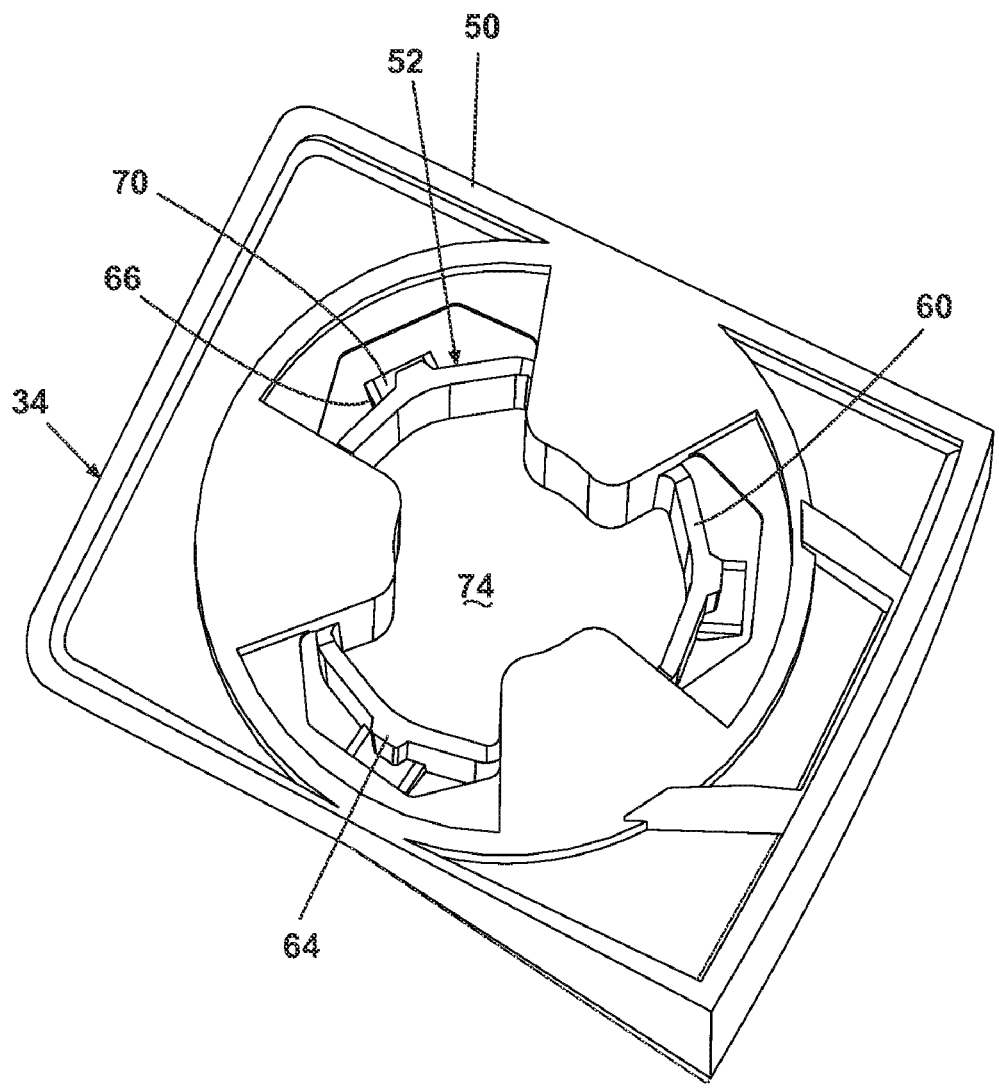
FIG. 6 is an enlarged perspective view of a lower surface of the base portion illustrated in FIG. 4.

Referring now to FIG. 5, the pivot column 52 is a generally trefoil-shaped body extending away from the contact surface 48 of the base portion 34. The pivot column 52 is illustrated as comprising three regularly-spaced, radially outwardly-disposed lobes 60 separated by three regularly-spaced channelways 72 defining three recesses 62. Alternatively, the pivot column 52 can comprise four regularly-spaced, radially outwardly—disposed lobes separated by four regularly-spaced recesses in a somewhat cross-shaped configuration. Extending radially outwardly from the apical center of each lobe 60 is a rib 64 extending longitudinally along the lobe 60 from the plane of the contact surface 48, and terminating in a hook-like or tooth-like catch 66 extending radially away from the lobes 60. The catch 66 is a generally wedge-shaped body comprising an inclined face 68 and an opposed orthogonal face 70 intersecting the rib 64. As illustrated in FIGS. 5 and 6, the channelways 72 are integrally connected to the contact surface 48 of the bearing plate 40 rigidly attach the pivot column 52 to the bearing plate 40. However, the lobes 60 are unattached to the contact surface 48. This enables the apical center of each lobe 60 to deflect radially inwardly in response to a force applied radially inwardly at the apical center of the lobe 60.

Figure 7:
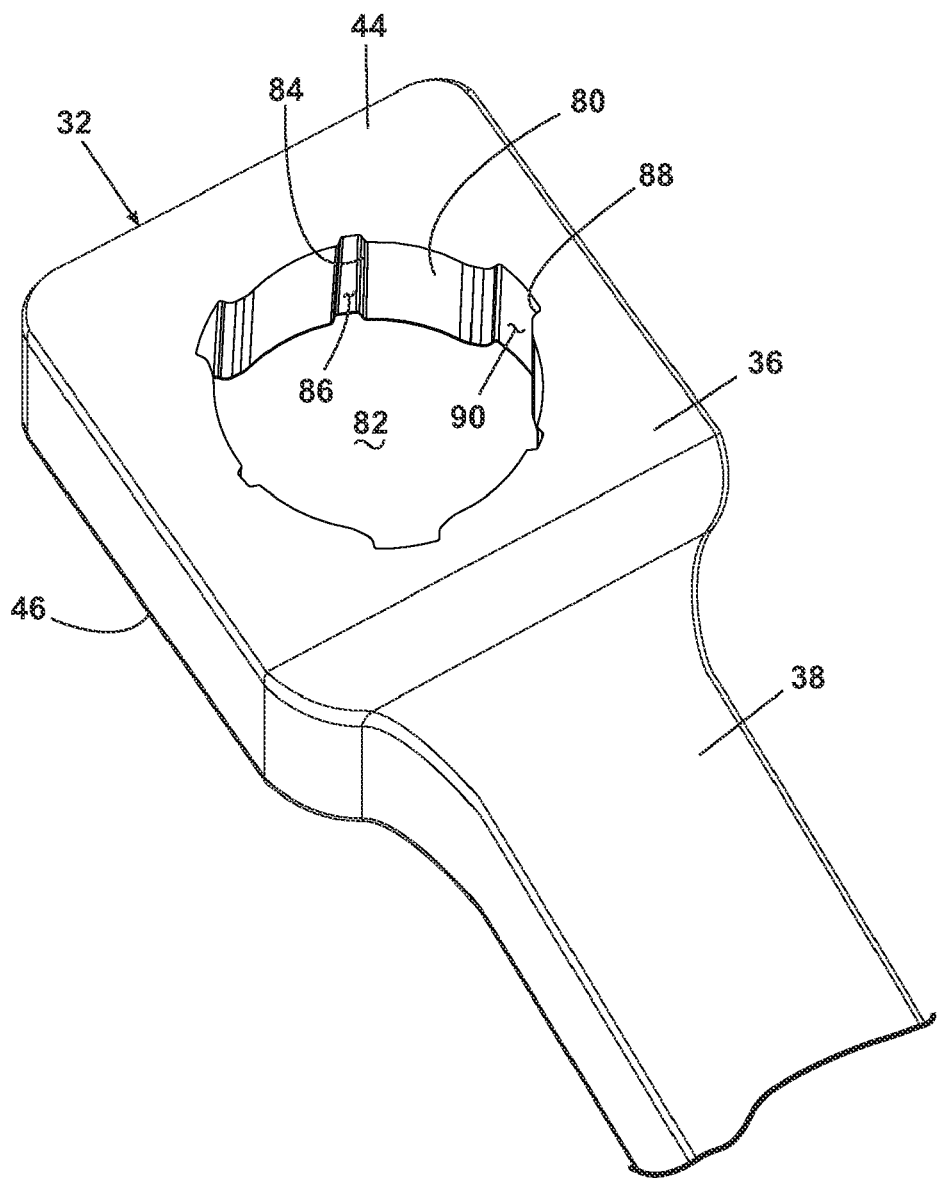
FIG. 7 is an enlarged perspective view of an upper surface of the support arm portion illustrated in FIG. 4.
Figure 8:
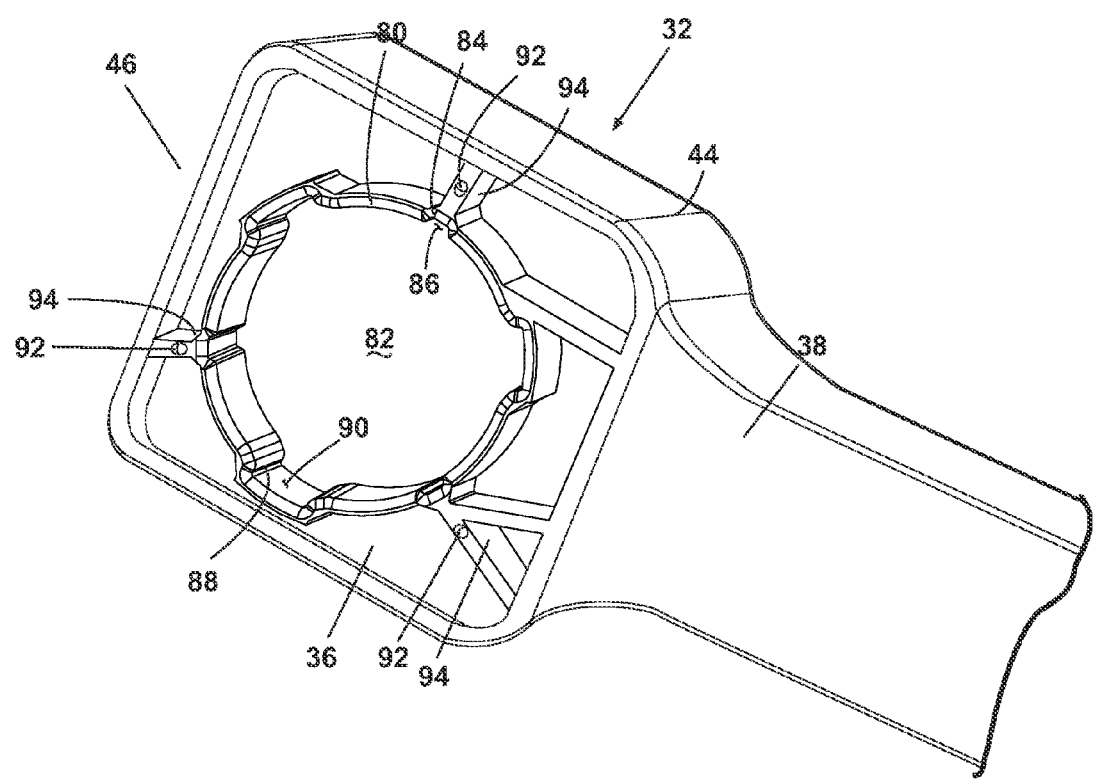
FIG. 8 is an enlarged perspective view of a lower surface of the support arm portion illustrated in FIG. 4.

Referring now to FIGS. 7 and 8, the bearing plate 36 of the support arm portion 32 is provided with a circumferential wall 80 extending between the upper surface 44 and the contact surface 46 to define a pivot opening 82 therethrough. The circumferential wall 80 is provided with three regularly—spaced, radially outwardly—disposed channelways 84 defining recesses 86 adapted for cooperative registry with the ribs 64. Three regularly—spaced, radially outwardly—disposed channelways 88 defining recesses 90 are disposed intermediate the channelways 84. The recesses 90 are adapted to enable the catches 66 to travel therealong as the pivot column 52 is inserted through the pivot opening 82. A plurality of semi-spherical projections 92, illustrated in FIG. 8 as numbering 3, extend away from the contact surface 46 of the bearing plate 36. The projections 92 are illustrated as extending from reinforcing ribs 94, although the projections 92 can be incorporated into other elements of the contact surface 46. The projections 92 are spaced from the rotational axis of the base portion 34 to maintain contact with the contact surface 48 when the support arm portion 32 is attached to the base portion 34.

Figure 9:
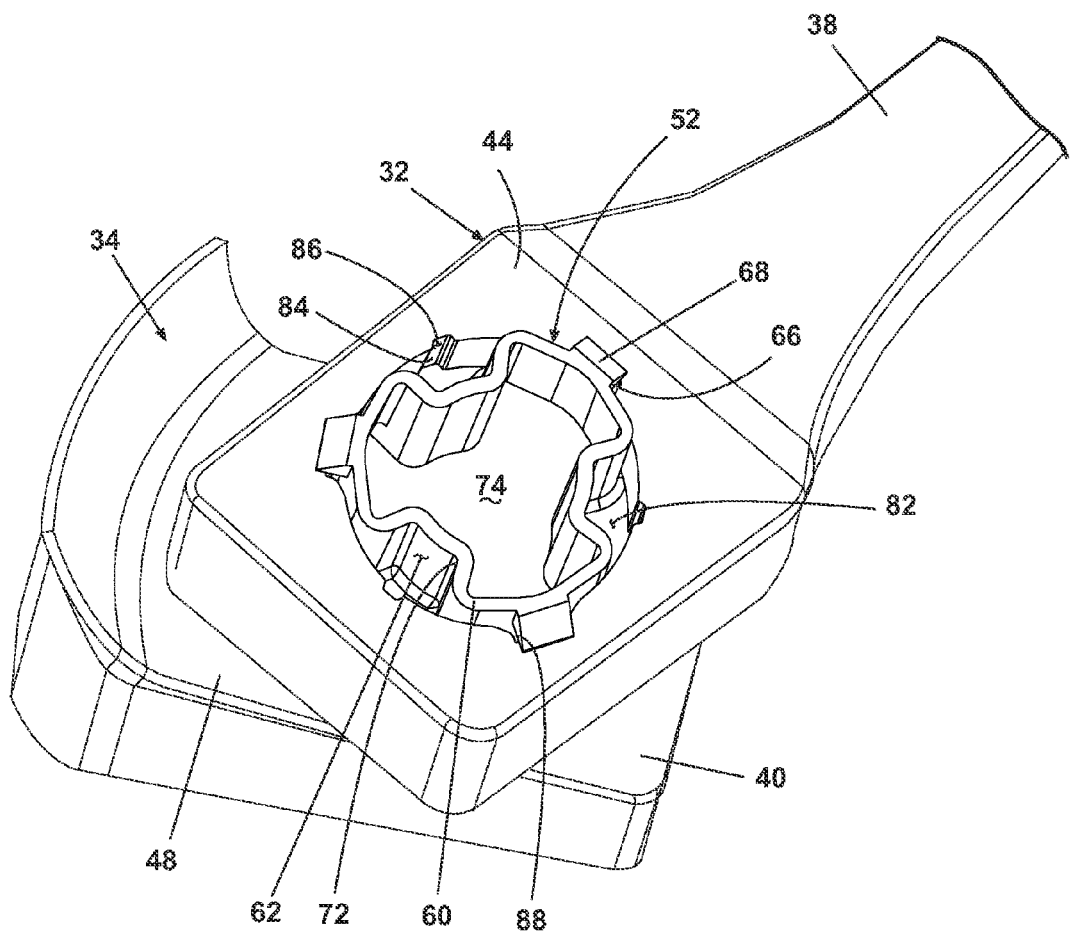
FIG. 9 is an enlarged upper perspective view of the support arm portion assembled to the base portion.
Figure 10:
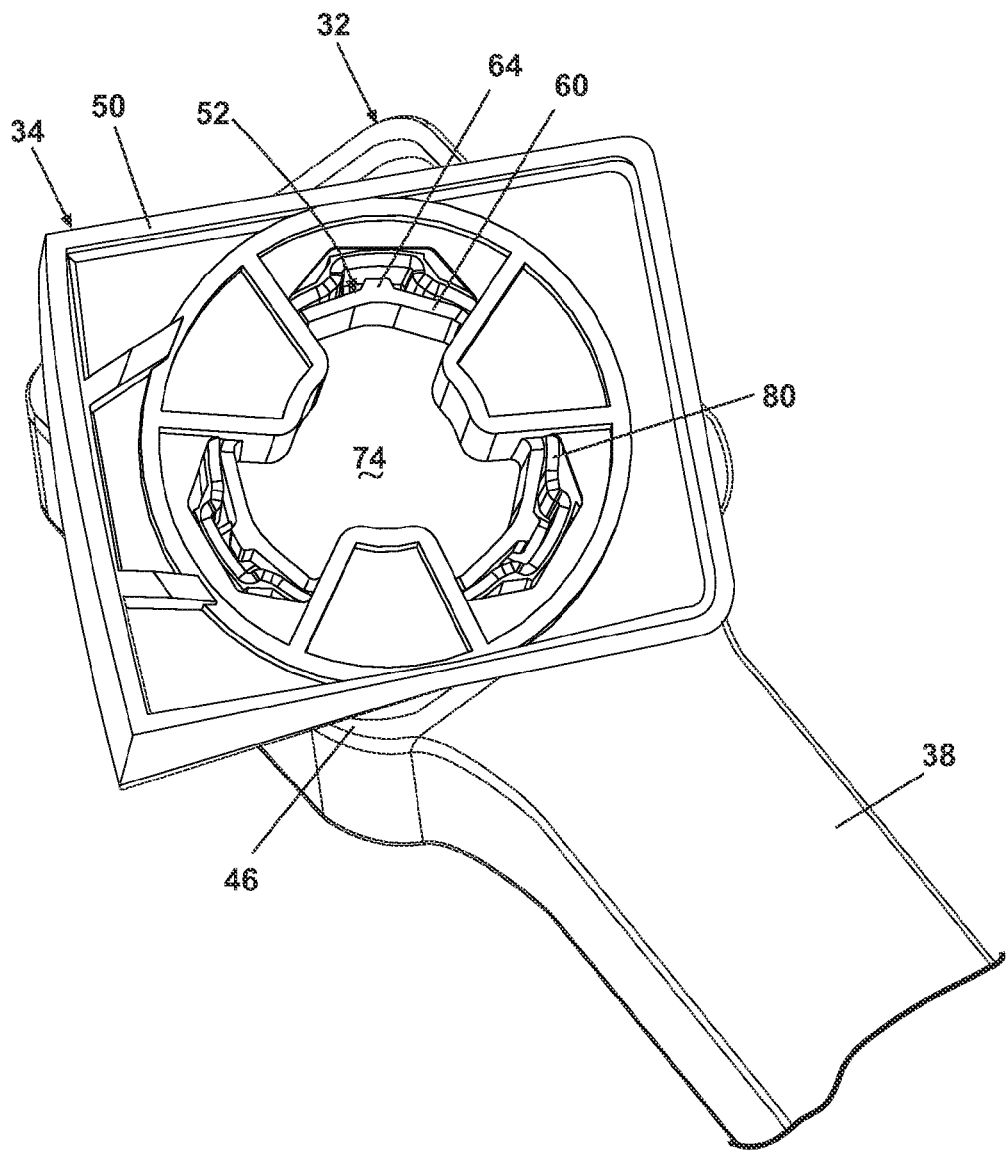
FIG. 10 is an enlarged lower a perspective view of the support arm portion assembled to the base portion.

Referring to FIGS. 9 and 10, the support arm portion 32 is attached to the base portion 34 by orienting the pivot column 52 relative to the pivot opening 82 so that the catches 66 can travel along the recesses 90. The support arm portion 32 is oriented relative to the base portion 34 so that the contact surface 46 of the bearing plate 36 slidably engages the contact surface 48 of the bearing plate 40. As the support arm portion 32 is brought into contact with the base portion 34, the catches 66 will be deflected radially-inwardly by engagement of the inclined faces 68 with the channelways 88 due to the inward flexibility of the lobes 60. As the contact surfaces 46, 48 are slidably engaged, the catches 66 will extend fully through the recesses 90 so that the orthogonal faces 70 will engage the upper surface 44 of the bearing plate 36, thereby retaining the support arm portion 32 against the base portion 34. The projections 92 will register with the contact surface 48 to maintain a tight fit between the support arm portion 32 and the base portion 34 to accommodate variations in the planarity of the contact surface 48 and reduce vibration of the support arm portion 32.

The support arm portion 32 can be pivoted relative to the base portion 34 by applying a rotating moment to the attachment arm 38 relative to the attachment post 42. The support arm portion 32 will be retained at selected positions defined by the engagement of the ribs 64 with the recesses 86. Alternatively, the support arm portion 32 can be positioned at any configuration intermediate the recesses 86, to be held in place by friction between the ribs 64 and the circumferential wall 80. During rotation of the support arm portion 32, the engagement of the ribs 64 with the circumferential wall 80 will deflect the apical center of the lobes 60 radially inwardly until the ribs 64 are aligned with the recesses 90.

Figure 11:
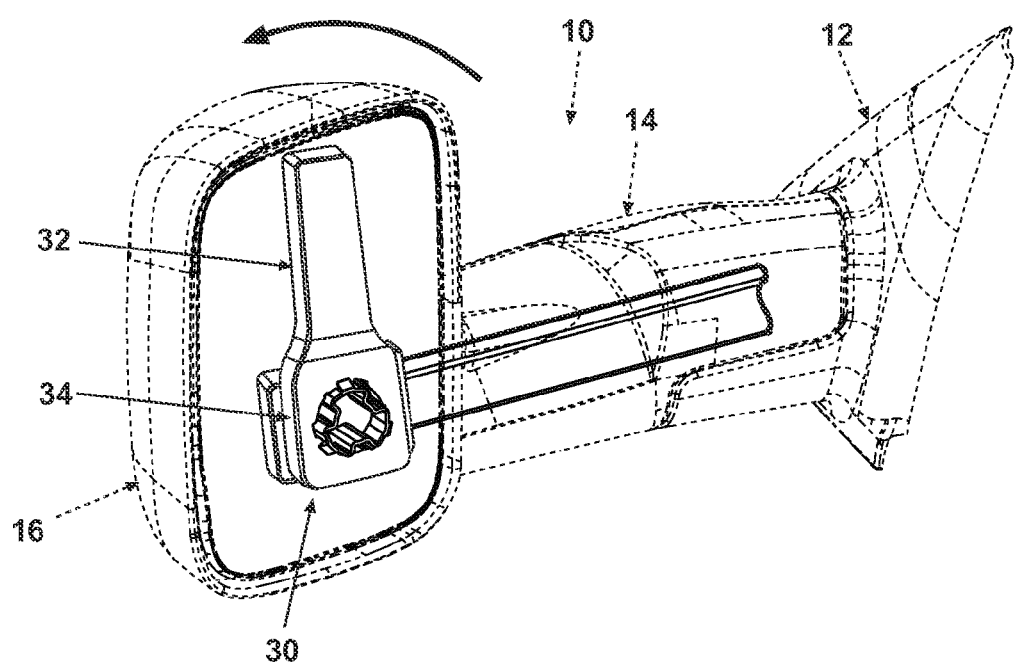
FIG. 11 is a rear perspective view of a motor vehicle mirror system illustrating a second embodiment of the pivot assembly utilized in a flip mirror system, with exterior portions of the mirror system shown in phantom.

FIG. 11 illustrates the pivot mechanism 30 utilized in a vehicular mirror system 10 comprising a reflective element assembly 16 which can pivot about a horizontal axis between an inboard and an outboard position. The pivot mechanism 30 is oriented so that the rotation of the support arm portion 32 relative to the base portion 34 is about a horizontal axis rather than the vertical axis previously described, and the base portion 34 is immovably attached to or integrated into the support arm 14 with the support arm portion 32 attached to or integrated into the reflective element assembly 16. Assembly and operation of the pivot mechanism 30 is essentially identical to that previously described.

Figure 12:
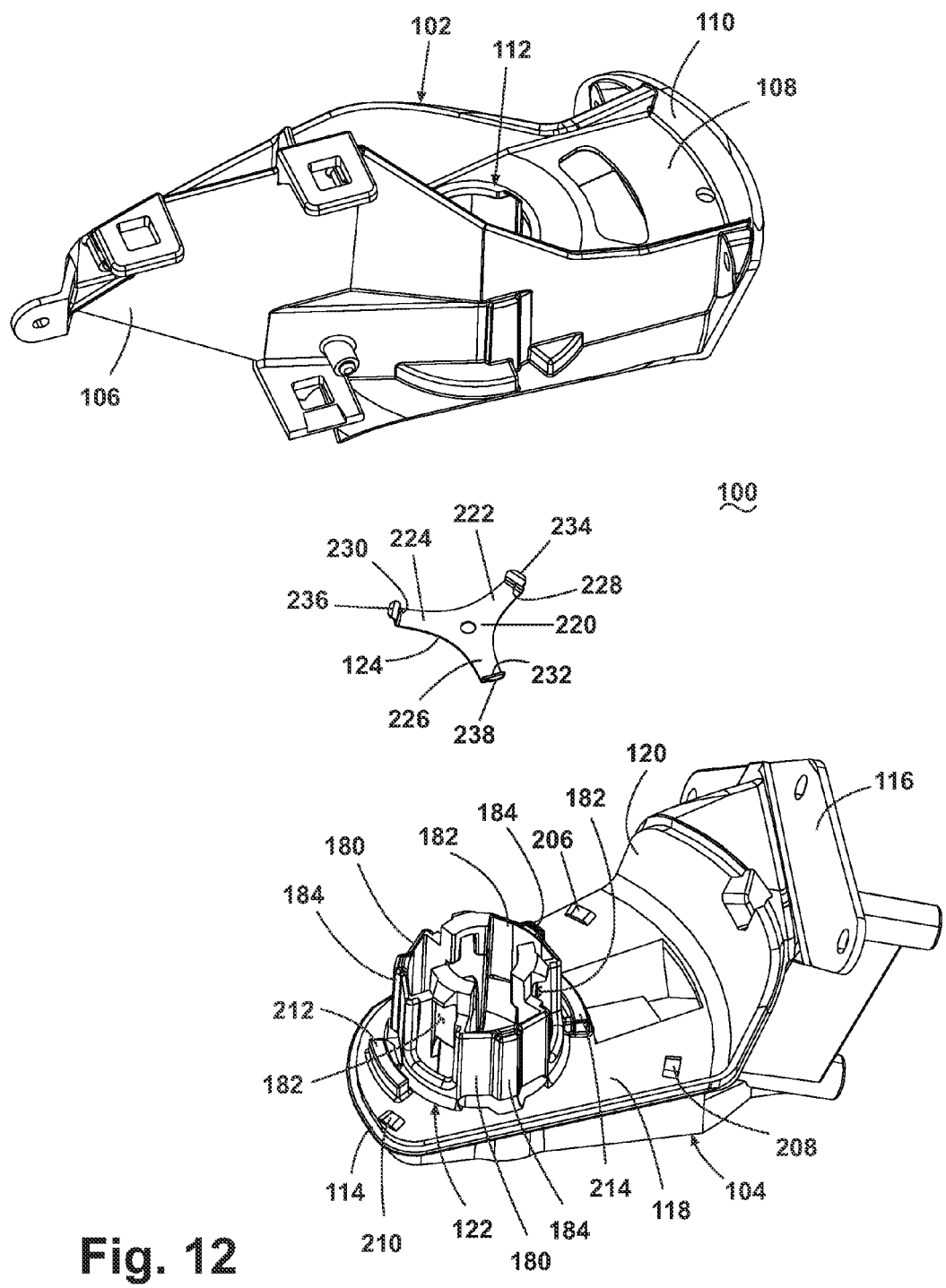
FIG. 12 is an exploded view of a third embodiment of the pivot assembly illustrating a support arm, a detent spring, and a base frame.
Figure 13:
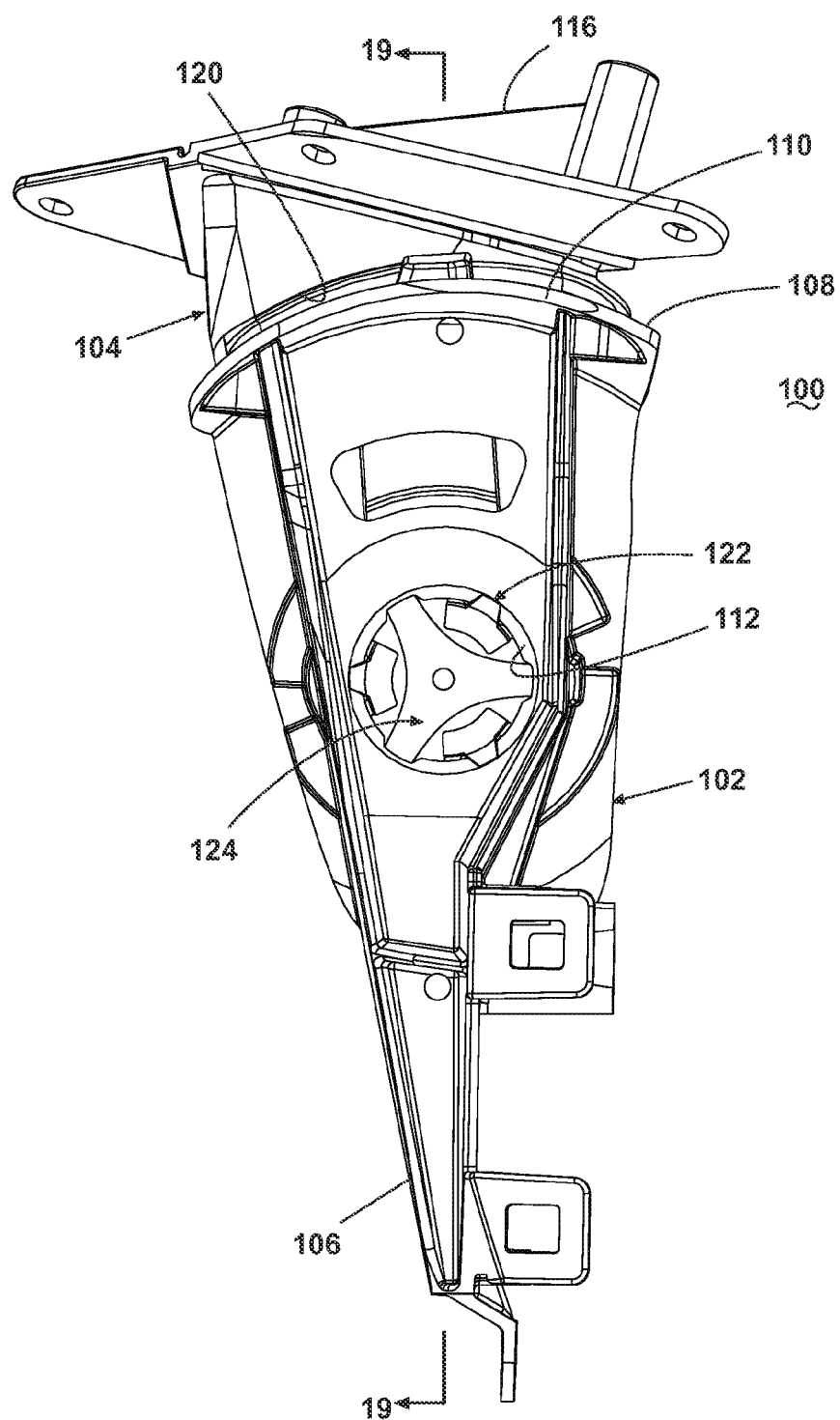
FIG. 13 is a plan view from above of the assembled pivot assembly illustrated in FIG. 12.

FIGS. 12-24 illustrate a third embodiment of the invention comprising a pivot assembly 100 adapted for incorporation into a vehicular mirror system 10 similar to that illustrated in FIG. 1. As illustrated in FIGS. 12 and 13, the pivot assembly 100 comprises a support arm 102 and a base frame 104. The support arm 102 has a distal end 106 adapted for attachment of a tilt actuator and reflective element assembly (not shown), and a proximal end 108 adapted for attachment to the base frame 104. The proximal end 108 terminates in an arcuate wall 110. A pivot opening 112 extends through the support arm 102 for attachment to the base frame 104, as hereinafter described.

The base frame 104 has a distal end 114 and a proximal end 116. The proximal end 116 is adapted for attachment to a motor vehicle in a generally well known manner. The proximal end 116 terminates distally in an arcuate wall 120. Extending from the arcuate wall 120 to the distal end 114 is a generally planar pivot floor 118. Extending generally orthogonally from the pivot floor 118 adjacent the distal end 114 is a pivot column 122 adapted for registry with the pivot opening 112, as hereinafter described.

The pivot assembly 100 also comprises a biasing element, illustrated in FIG. 12 as a tricrural detent spring 124. The detent spring 124 facilitates the operation of a detent assembly which is activated when the support arm 102 is rotated relative to the base frame 104.

Figure 14:
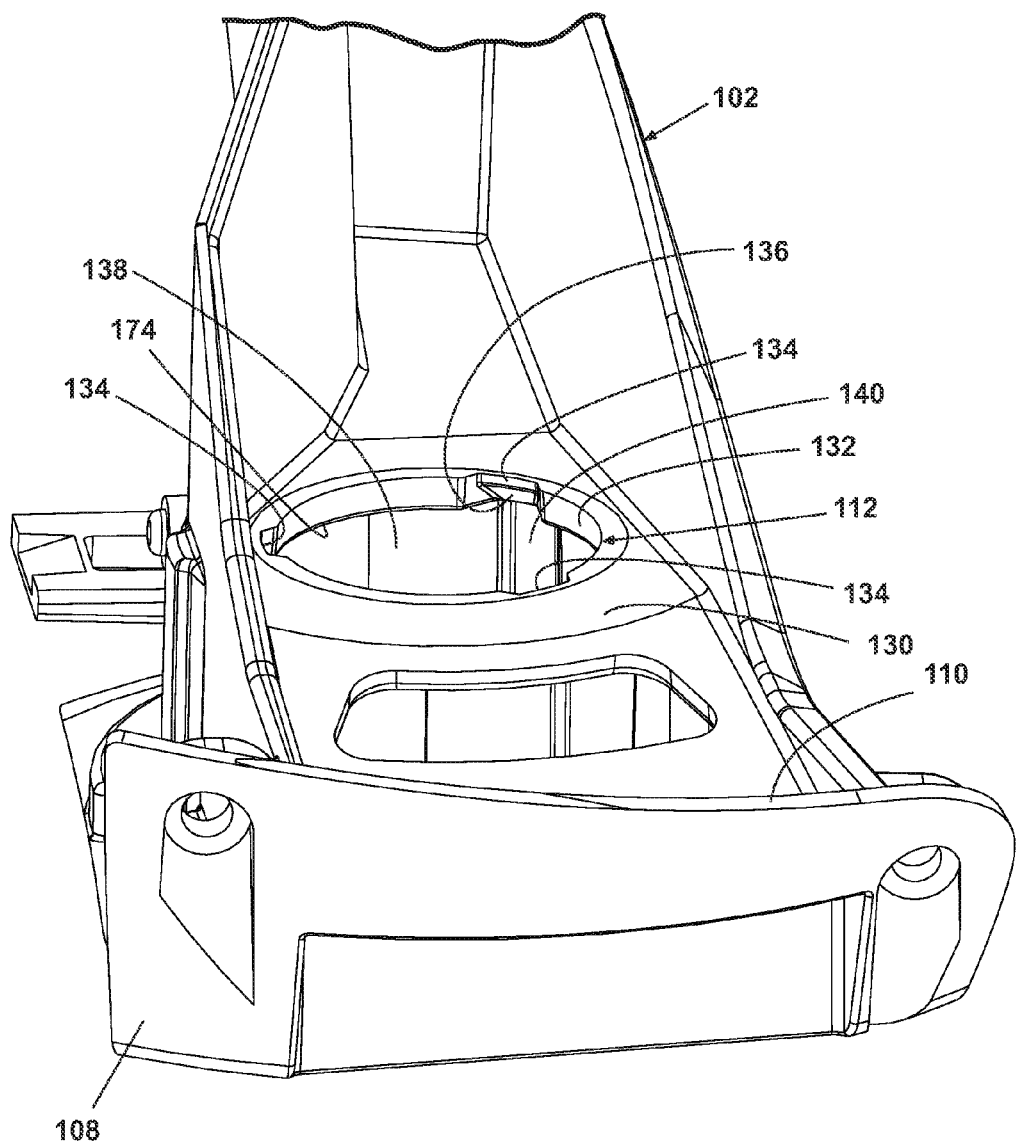
FIG. 14 is an enlarged perspective view of a portion of the support arm illustrated in FIG. 12 showing an opening in the support arm comprising a portion of the pivot assembly.

As illustrated in FIG. 14, a planar top wall 130 generally circumscribes the pivot opening 112. Depending from the top wall 130 is a circumferential wall 132 forming a generally circular, inwardly extending lip around the pivot opening 112. A plurality of retainer notches 134 extend radially into the circumferential wall 132. Preferably, three retainer notches 134 are utilized, spaced regularly at 120°. The retainer notches 134 transition to an inclined surface 136 extending radially outwardly away from the circumferential wall 132. A detent wall 138 extends coaxially away from the circumferential wall 132, and has a diameter somewhat greater than the diameter of the circumferential wall 132. The detent wall 138 is provided with a plurality of longitudinally extending detent channels 140, corresponding in alignment with the retainer notches 134, inset radially away from the detent wall 138. Thus, the detent wall 138 illustrated in FIG. 14 comprises three detent channels 140.

Figure 15:
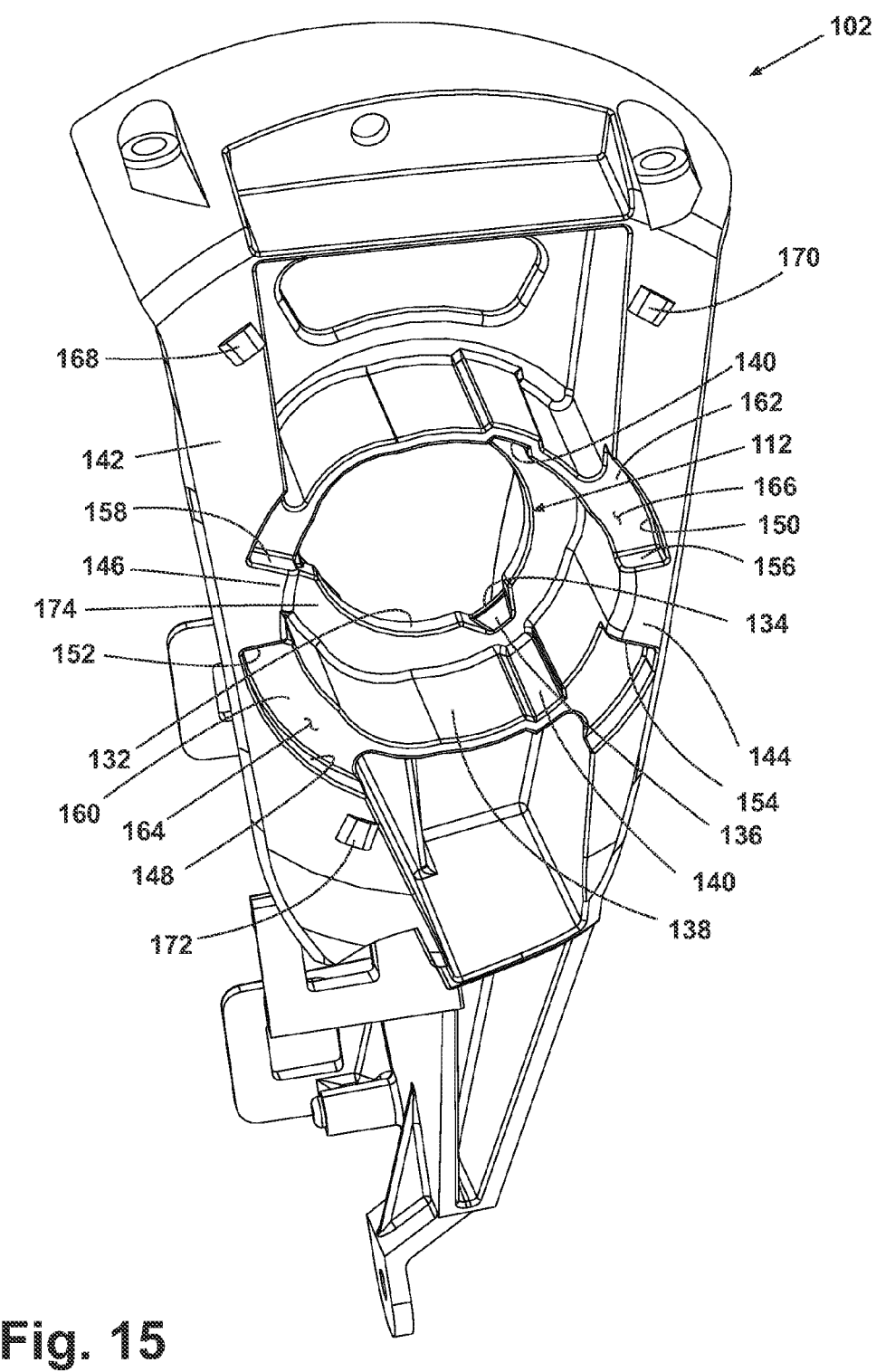
FIG. 15 is a perspective view from below of the support arm illustrated in FIG. 12 showing the opening in the support arm.

FIG. 15 illustrates the alignment of the detent channels 140 with the retainer notches 134. The detent wall 138 terminates in a bottom wall 142 forming a lower surface of the support arm 102 spaced from and generally parallel to the top wall 130. The bottom wall 142 extends radially inwardly to define a pair of generally diametrically opposed stop blocks 144, 146. Extending circumferentially along the detent wall 138 between the stop blocks 144, 146 is an arcuate distal channelway 164. Extending circumferentially along the detent wall 138 between the stop blocks 144, 146, in diametric opposition to the distal channelway 164, is a proximal channelway 166. The distal channelway 164 is provided with a planar upper wall 160 extending along the circumference of the detent wall 138, and the proximal channelway 166 is provided with a planar upper wall 162 extending along the circumference of the detent wall 138. An arcuate distal wall 148 extends radially away from the upper wall 160 between the stop blocks 144, 146 to define an outer circumference of the distal channelway 164. The distal wall 148 terminates in a planar end wall 152 at the stop block 146, and in a planar end wall 154 at the stop block 144. An arcuate proximal wall 150 extends radially away from the upper wall 162 between the stop blocks 144, 146 to define an outer circumference of the proximal channelway 166. The proximal wall 150 terminates in a planar end wall 156 at the stop block 144, and in a planar end wall 158 at the stop block 146.

Three trapezoidal bosses 168, 170, 172 extend from the bottom wall 142 radially away from the pivot opening 112. The circumferential wall 132 transitions to an annular bearing wall 174 extending between the circumferential wall 132 and the detent wall 138.

Figure 16:
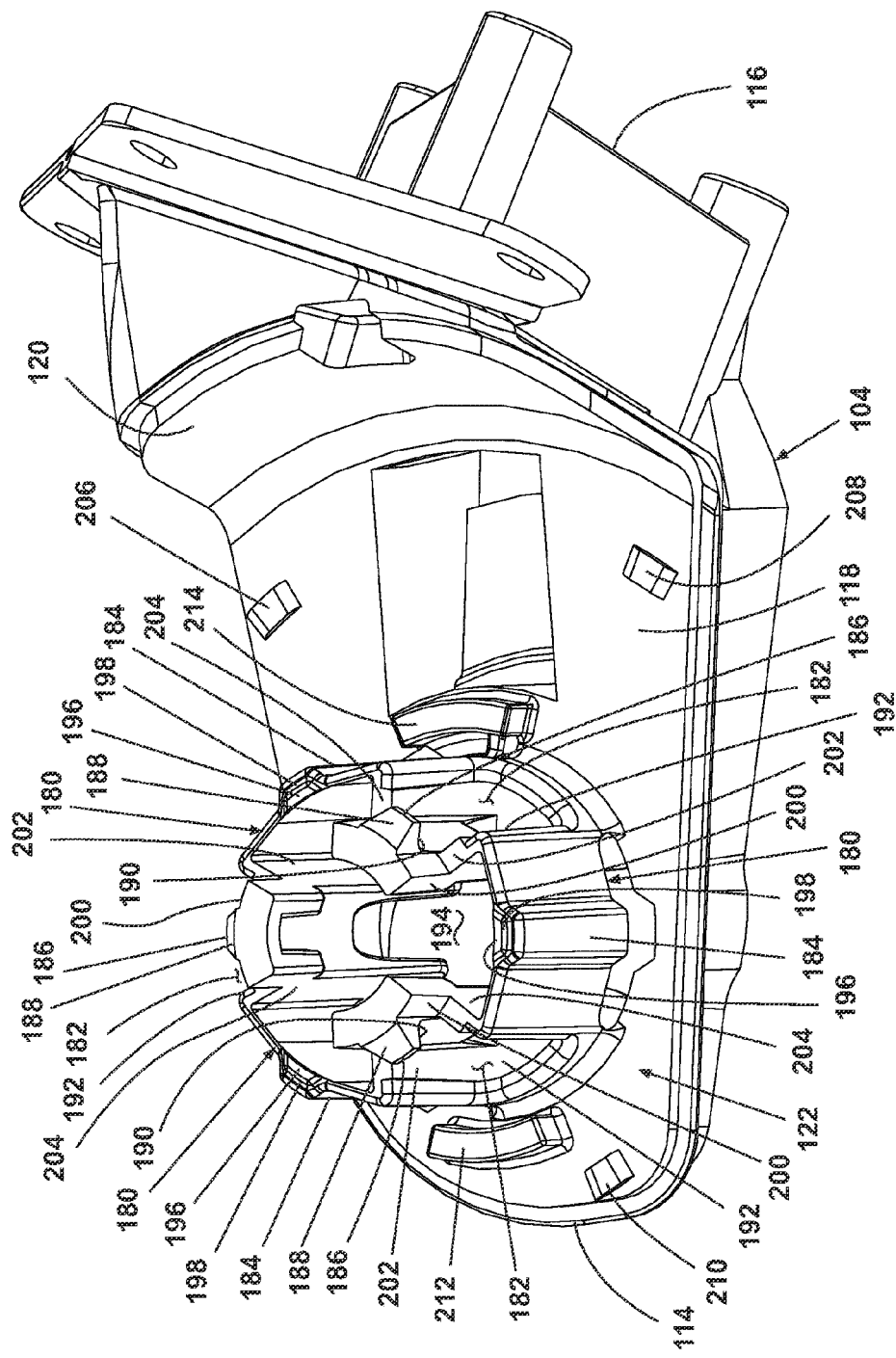
FIG. 16 is a perspective view from above of the base frame illustrated in FIG. 12 showing a pedestal comprising a portion of the pivot assembly.
Figure 17:
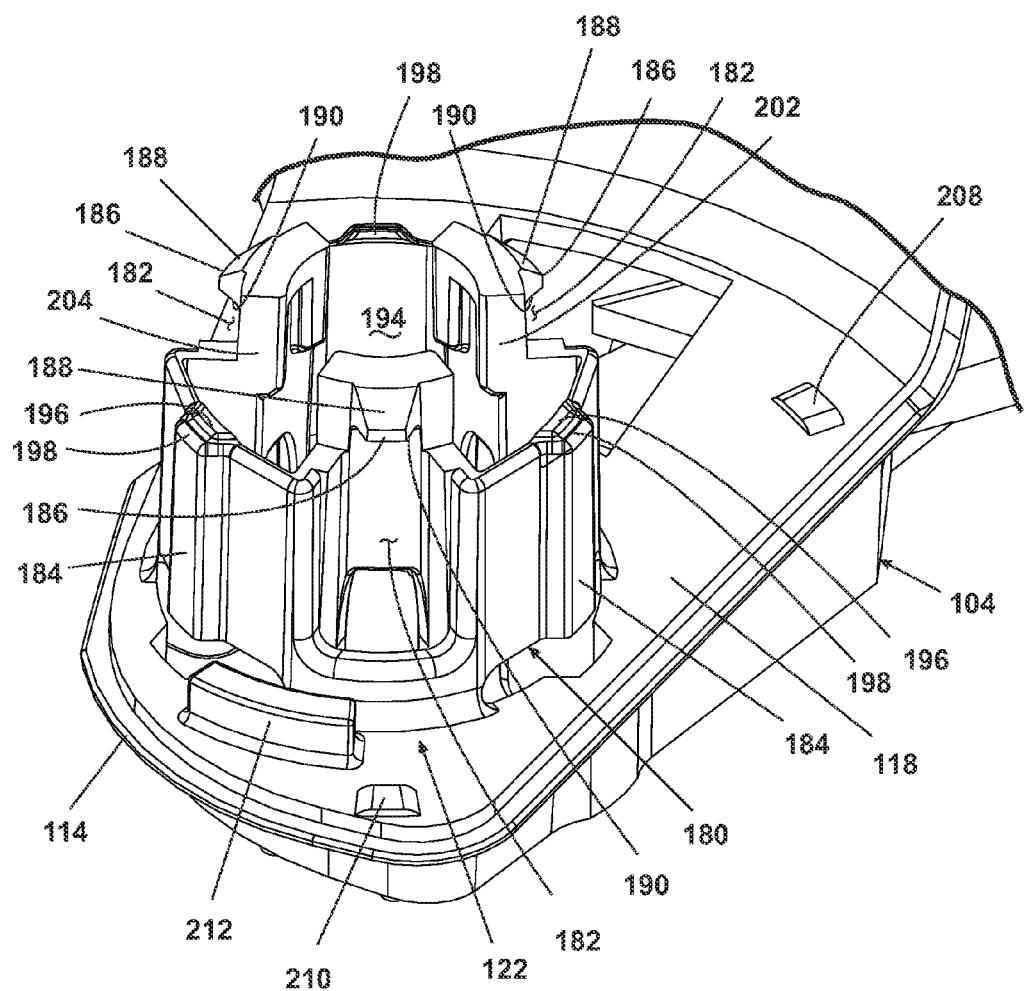
FIG. 17 is an enlarged perspective view of a portion of the base frame illustrated in FIG. 16.
Figure 18:
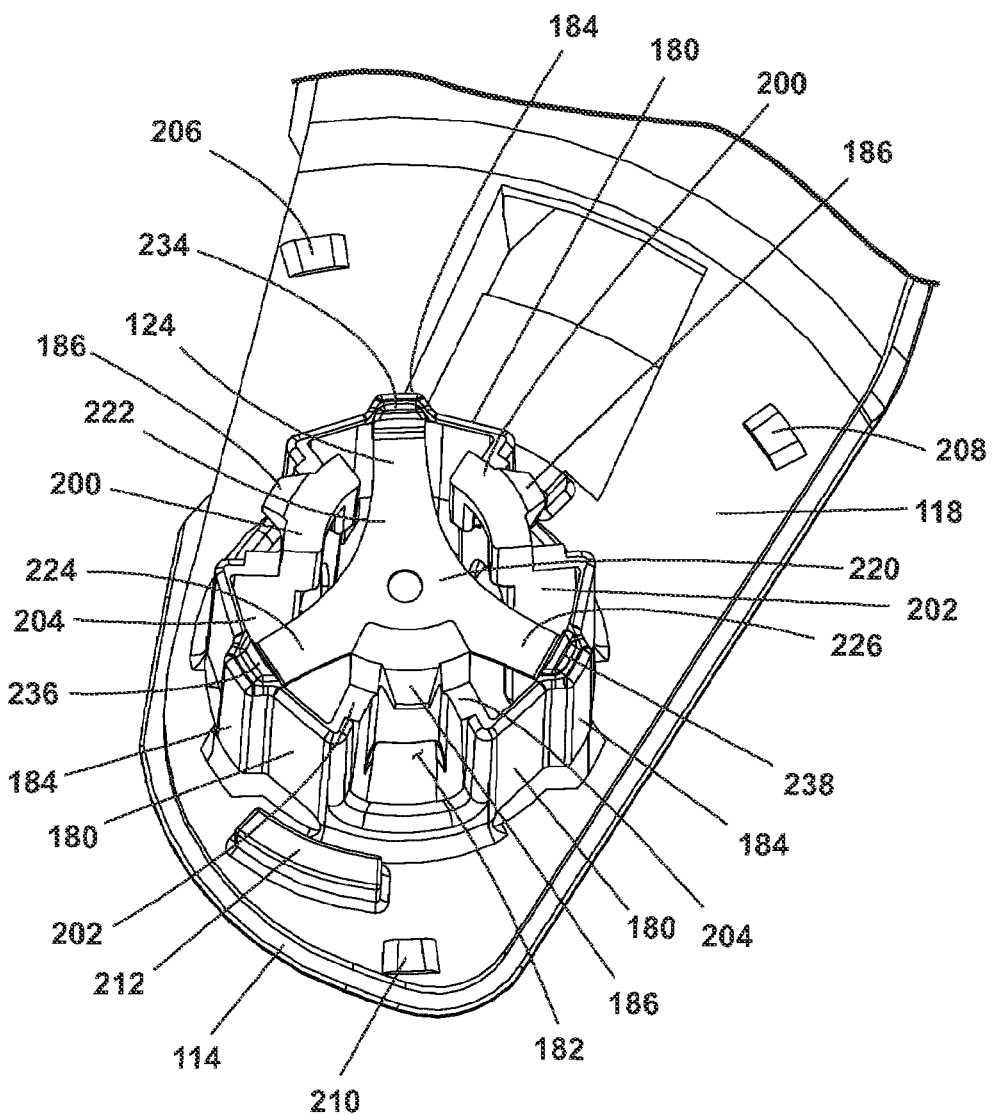
FIG. 18 is an enlarged perspective view of a portion of the base frame illustrated in FIG. 16 showing a detent spring comprising a first embodiment of a biasing member disposed relative to the pedestal.

Referring now to FIGS. 16 and 17, the pivot column 122 is a somewhat trefoil shaped body extending generally orthogonally away from the pivot floor 118. The pivot column 122 comprises three regularly-spaced longitudinal lobes 180 separated by three regularly-spaced longitudinal recesses 182. Extending radially outwardly from the apical center of each lobe 180 is a rib 184 extending longitudinally along the lobe 180 from the plane of the pivot floor 118, and terminating in an upwardly-extending bearing surface 198 bordering a recess 196. The lobes 180 are separated from the pivot floor 118 to enable the lobes 180 to readily deflect radially inwardly in response to a force applied radially inwardly against the ribs 184.

The lobes 180 transition to the recesses 182 through a pair of radially-aligned opposing side walls 202, 204 which define the lateral boundaries of the recesses 182. The side walls 202, 204 terminate inwardly in an arcuate catch wall 200 extending somewhat above the side walls 202, 204 and defining, with the side walls 202, 204, a channelway 192. Extending radially outwardly from the catch wall 200 is a catch 186 having an upper inclined face 188 and a lower orthogonal face 190. The lobes 180 and the recesses 182 define a trefoil shaped opening 194 extending through the base frame 104.

Three trapezoidal stability bosses 206, 208, 210 extend from the pivot floor 118 radially away from the opening 194, and are adapted for operable disposition with the bosses 168, 170, 172 when the support arm 102 is attached to the base frame 104. Extending upwardly from the pivot floor 118 along the distal side of the pivot column 122 is an arcuate distal stop 212. Extending upwardly from the pivot floor 118 along the proximal side of the pivot column 122 is an arcuate proximal stop 214. The distal stop 212 is adapted for operable registry with the distal channelway 164, and the proximal stop 214 is adapted for operable registry with the proximal channelway 166, when the support arm 102 is attached to the base frame 104.

As illustrated in FIG. 18, and referring again to FIG. 12, the detent spring 124 comprises a hub 220 transitioning to three elongated blades 222, 224, 226 extending radially therefrom. Each blade 222, 224, 226 terminates in a projection wall 228, 230, 232 extending orthogonally therefrom, in turn terminating in a radially outwardly extending flange 234, 236, 238 adapted for seating in the recess 196 formed in the upper portion of the lobe 180. The blades 222, 224, 226 of the detent spring 124 are adapted to resiliently flex in response to the radially inward deflection of the lobes 180, and to facilitate the radially outward rebounding of the lobes 180 upon removal of an inwardly directed force.

Figure 19:
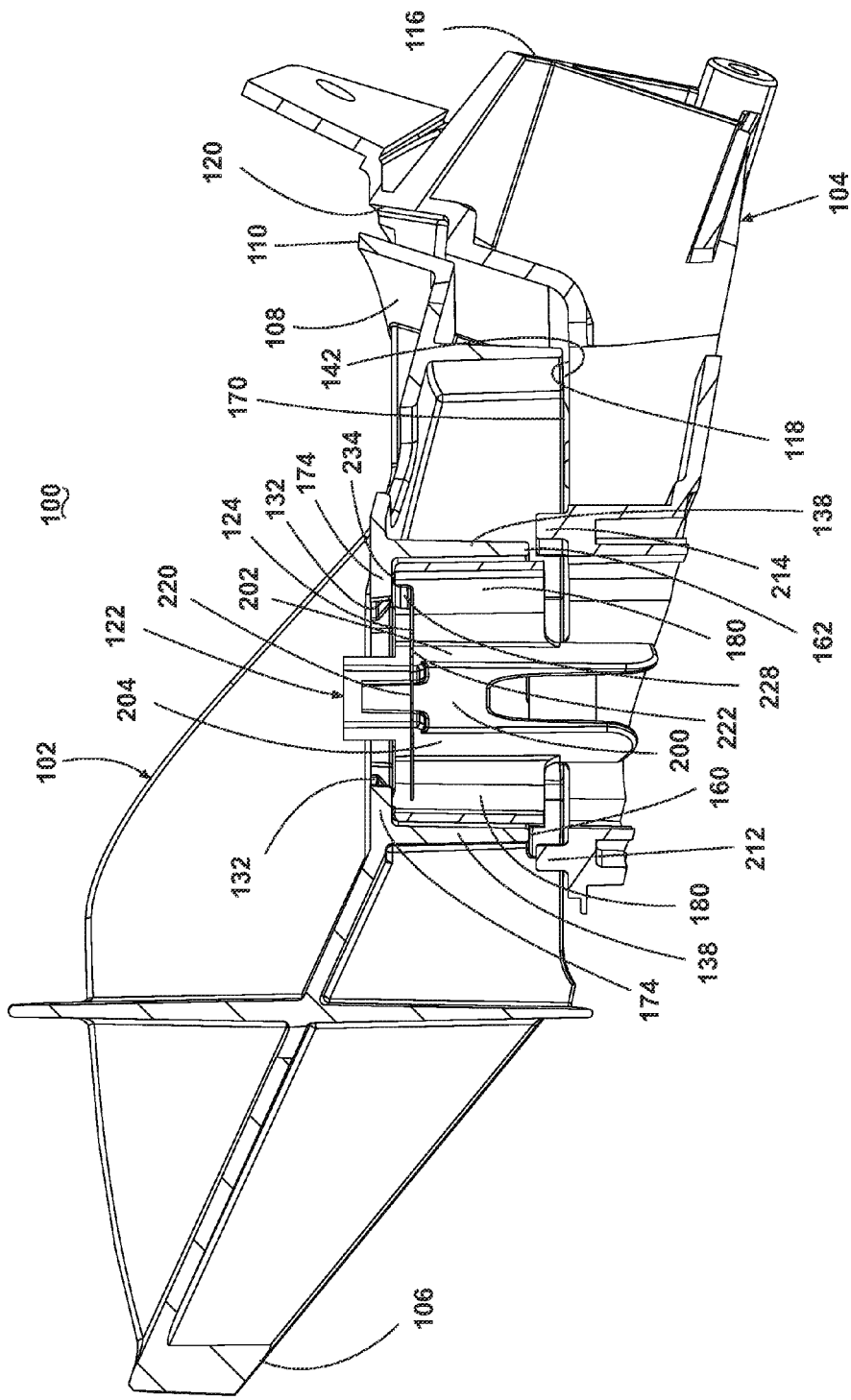
FIG. 19 is a sectional view taken along view line 19-19 of FIG. 13.

Referring again to FIGS. 12 and 13, and to FIG. 19, the support arm 102 is attached to the base frame 104 by aligning the pivot column 122 with the pivot opening 112 so that the ribs 184 are slidably received in the detent channels 140, the distal stop 212 is aligned with the distal channelway 164, and the proximal stop 214 is aligned with the proximal channelway 166. As the pivot column 122 is urged toward the pivot opening 112, the inclined faces 188 of the catches 186 will engage the inclined surfaces 136 of the retainer notches 134, thereby urging the catch walls 200 into radially inward deflection. As the catch walls 200 deflect, the catches 186 will clear the retainer notches 134 and then rebound outwardly so that the orthogonal faces 190 of the catches 186 will engage the top wall 130, thereby preventing the pivot column 122 from being removed from the pivot opening 112, and retaining the support arm 102 on the base frame 104.

When the support arm 102 is assembled to the base frame 104, the bearing surface 198 will be urged into contact with the bearing wall 174, thereby retaining the flanges 234, 236, 238 in the recesses 196, and preventing movement of the detent spring 124 out of engagement with the lobes 180.

When the support arm 102 is rotated relative to the base frame 104, the ribs 184 will be urged out of the detent channels 140 and into contact with the detent wall 138. For this to occur, the ribs 184 must deflect radially inwardly. At the same time, the blades 222, 224, 226 of the detent spring 124 will flex, and will remain flexed, applying a radially outward force to the ribs 184 against the detent wall 138 until the ribs 184 engage adjacent detent channels 140. The ribs 184 will be urged into the detent channels 140 to position the support arm 102 relative to the base frame 104. The ribs 184 and channels 140 are adapted so that the ribs 184 will engage the channels 140 when the support arm 102 is folded forward against the vehicle, folded rearward against the vehicle, or folded outward in a viewing position. In both the folded forward and folded rearward positions, the distal stop 212 will engage an end wall 152, 154 of the distal channelway 164, and the proximal stop 214 will engage an end wall 156, 158 of the proximal channelway 166, to prevent further folding of the support arm 102 against the vehicle.

Figure 20:
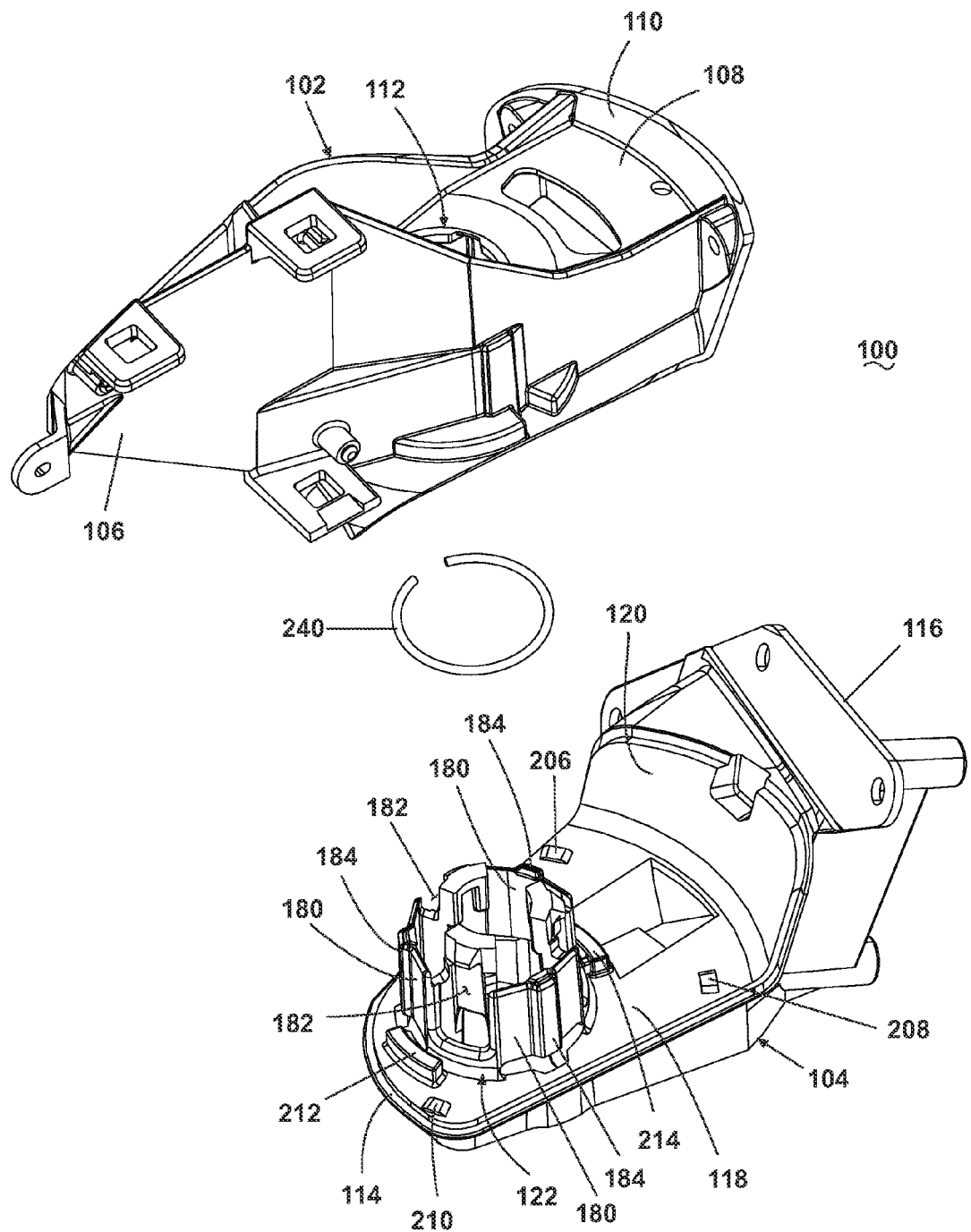
FIG. 20 is an exploded view of the support arm, the base frame, and a second embodiment of a biasing member comprising a C-ring.
Figure 21:
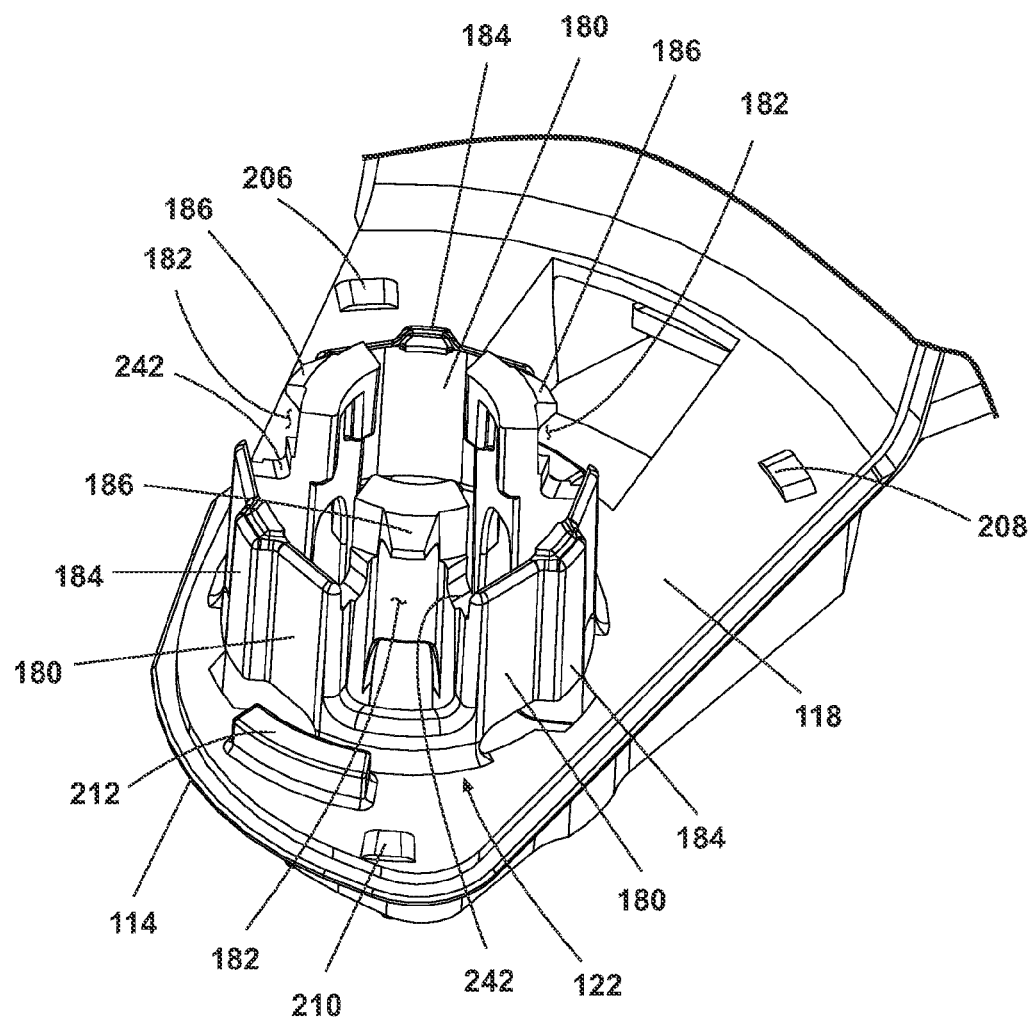
FIG. 21 is an enlarged perspective view of a portion of the base frame showing an alternative embodiment of the pedestal.
Figure 22:
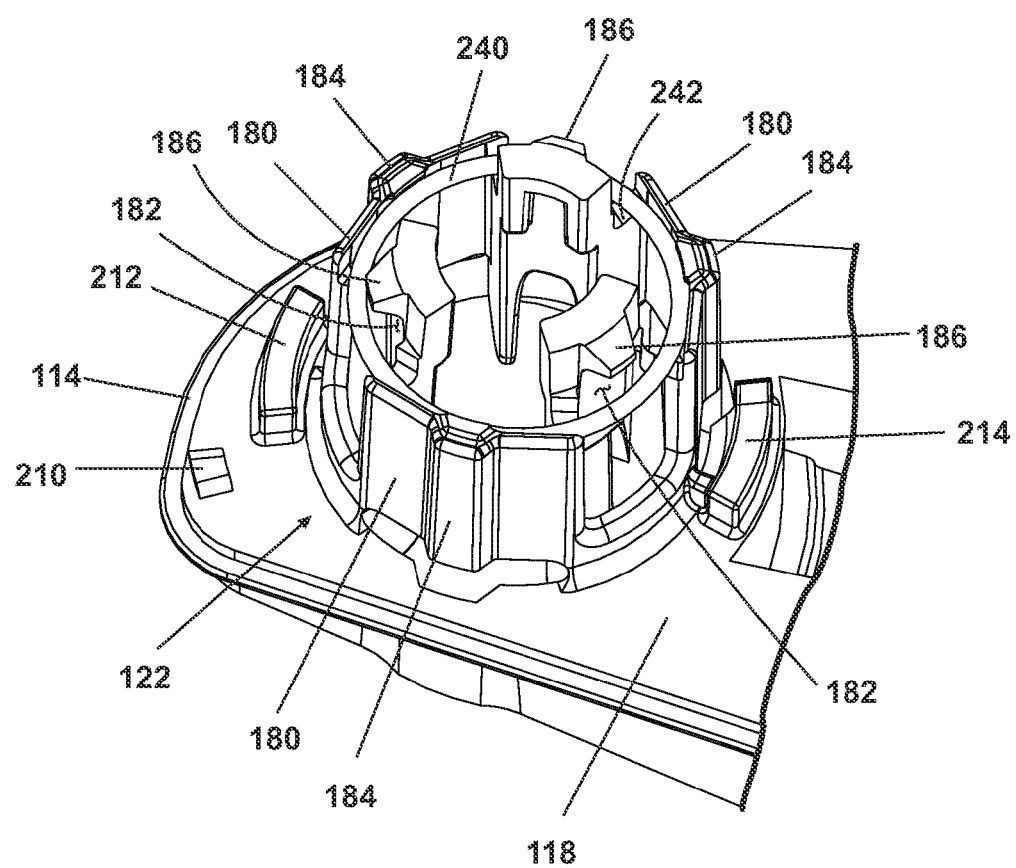
FIG. 22 is an enlarged perspective view of a portion of the base frame illustrated in FIG. 21 showing the pedestal supporting the C-ring.

FIGS. 20-22 illustrate an alternate embodiment of the biasing element comprising a C-ring 240. The pivot column 122 is identical to the previously described pivot column, except that upwardly opening cradles 242 are formed in the top end of the side walls 202, 204 between the lobes 180 and the catch walls 200. The cradles 242 are adapted for cradling of the C-ring 240 therein. As illustrated in FIG. 22, the C-ring 240 provides a radially outwardly directed force against the lobes 180 to enable radially inward and outward flexure of the lobes 180 when the ribs 184 move out of the detent channels 140, along the detent wall 138, and into adjacent channels 140.

Figure 23:
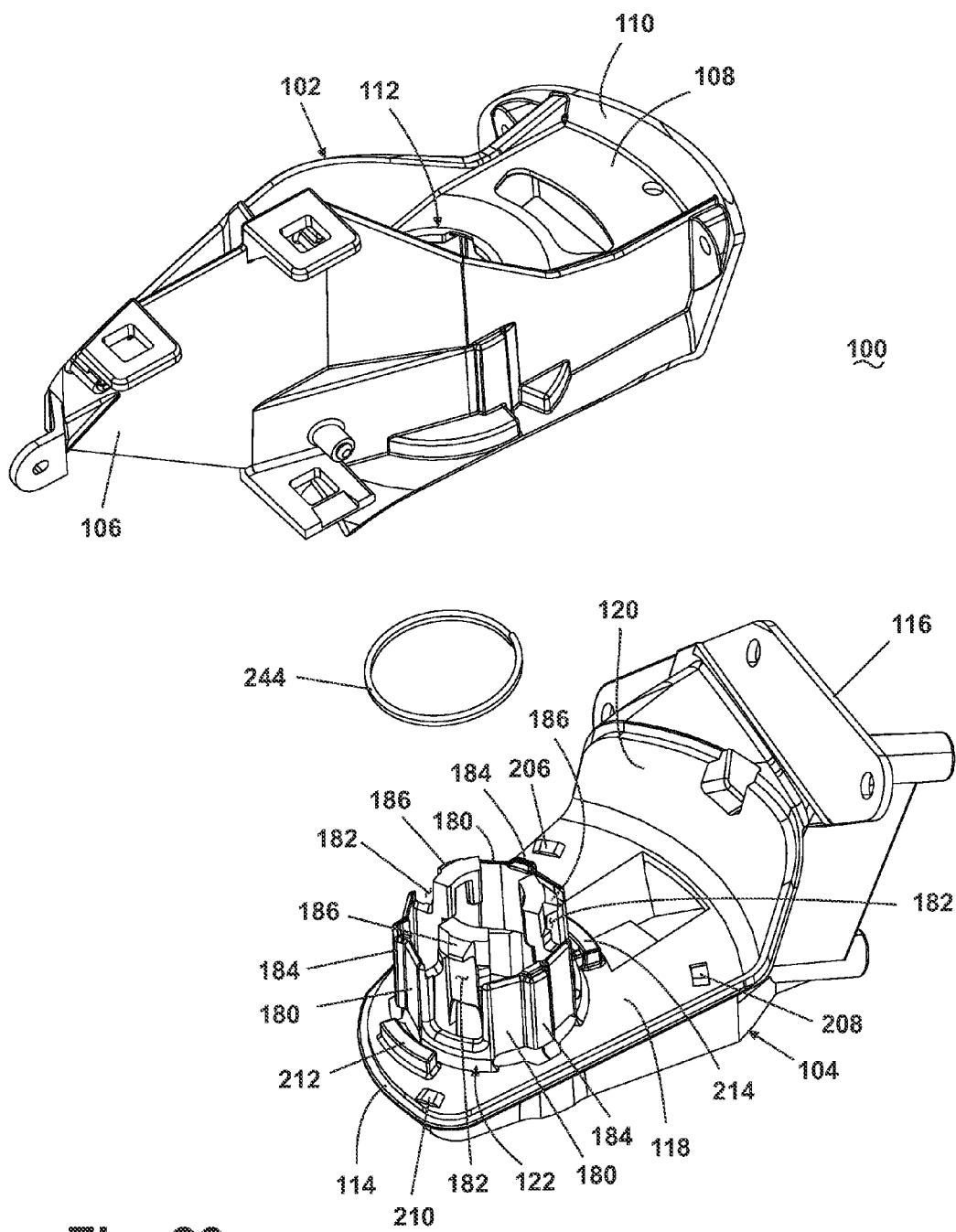
FIG. 23 is an exploded view of the support arm, the base frame, and a third embodiment of a biasing member comprising a helical ring.
Figure 24:
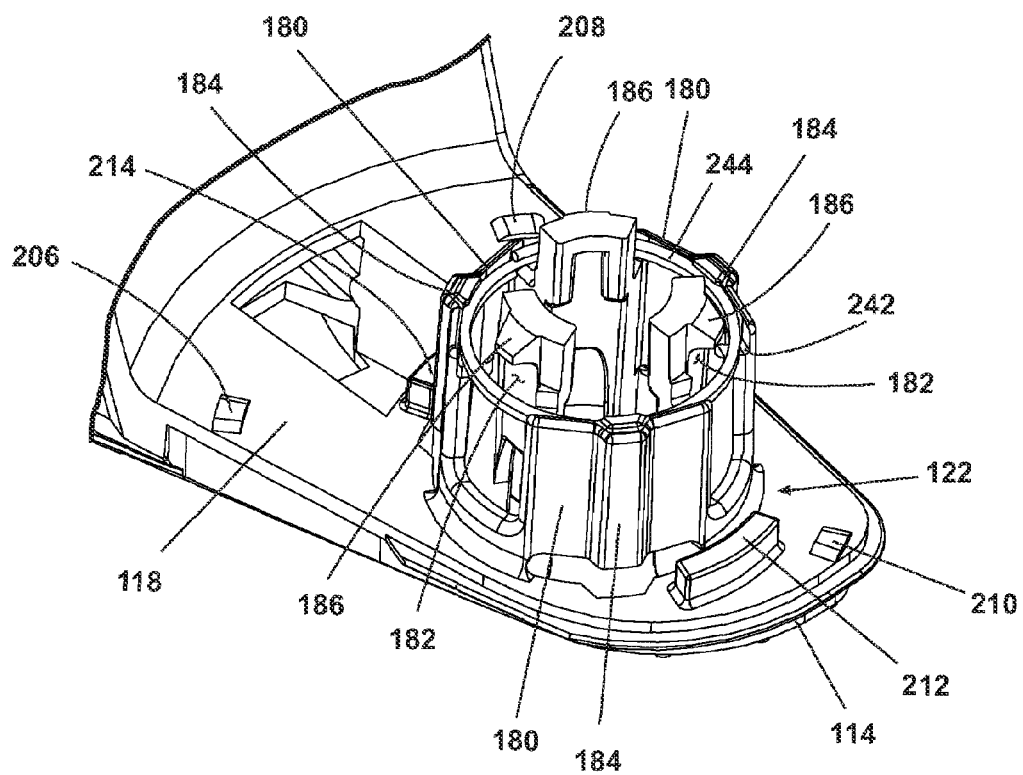
FIG. 24 is an enlarged perspective view of a portion of the base frame illustrated in FIG. 23 showing the pedestal supporting the helical ring.

FIGS. 23-25 illustrate another alternate embodiment of the biasing element comprising a helix ring 244, which is installed in the pivot column 122, and supported by the cradles 242, in a manner similar to the C-ring 240. The helix ring 244 provides a radially outwardly directed force against the lobes 180 to enable radially inward and outward flexure of the lobes 180 when the ribs 184 move out of the detent channels 140, along the detent wall 138, and into adjacent channels 140.

During rotation of the support arm 102 relative to the base frame 104, the bottom wall 142 will be in contact with and ride along the stability bosses 206, 208, 210. Similarly, the pivot for 118 will be in contact with and ride along the bosses 168, 170, 172. The bosses will facilitate the support of the support arm 102 on the base frame 104, and will prevent rocking of the support arm 102 relative to the base frame 104, while minimizing frictional resistance between the support arm 102 and the base frame 104.

The pivot assembly 100 can alternatively be incorporated into a connection for coupling a reflective element assembly to a support arm for pivoting of the reflective element assembly relative to the support arm about a generally horizontal axis.

The pivot connection described herein is a simple two-piece connection which is readily fabricated, and easily assembled without the need for special assembly tools. The connection is configured to provide a plurality of precise stops without the addition of costly, weight-adding elements. Positioning the detent assembly radially about the pivot connection enables the relative axial movement of the mating components of the pivot connection while maintaining the detent elements in close engagement.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A vehicular exterior rearview mirror system comprising:
   a reflective element assembly for providing an occupant of a vehicle with a rearward view;
   a base frame for coupling the reflective element assembly to a vehicle;
   a support arm for coupling the reflective element assembly to the base frame;
   a pivot connection for coupling the support arm to one of the base frame and the reflective element assembly for pivotal movement of one of the support arm relative to the base frame and the reflective element assembly relative to the support arm, and comprising
   a pedestal coupled with one of the base frame, the support arm, and the reflective element assembly, and having at least two detent ribs; and
   an opening in the other of the base frame, the support arm, and the reflective element assembly for receipt of the pedestal therethrough, and having at least two detent channels;
   wherein pivoting of one of the support arm relative to the base frame and the reflective element assembly relative to the support arm moves a first one of the at least two detent ribs out of a first one of the at least two detent channels and into a second one of the at least two detent channels to position the one of the support arm and the reflective element assembly into a preselected location relative to the one of the base frame and the support arm, respectively.

2. A vehicular exterior rearview mirror system according to claim 1 wherein the pedestal comprises at least two radially-outwardly directed lobes, each transitioning at a central portion thereof in a radially-outwardly directed longitudinal rib.

3. A vehicular exterior rearview mirror system according to claim 2 wherein each lobe terminates at an upper portion in a radially-outwardly directed catch.

4. A vehicular exterior rearview mirror system according to claim 3 wherein the opening comprises at least two longitudinal channelways for slidable registry with the radially-outwardly directed catches.

5. A vehicular exterior rearview mirror system according to claim 3 wherein the opening is surrounded by a planar surface for registry with the catches when the pedestal is inserted into the opening.

6. A vehicular exterior rearview mirror system according to claim 2 wherein the lobes are separate from the one of the base frame, the support arm, and the reflective element assembly to enable the lobes to alternately deflect radially-inwardly and radially-outwardly.

7. A vehicular exterior rearview mirror system according to claim 1 wherein the at least two radially-outwardly directed lobes are separated by longitudinal recesses.

8. A vehicular exterior rearview mirror system according to claim 7 wherein each longitudinal recess terminates at an upper portion in a radially-outwardly directed catch.

9. A vehicular exterior rearview mirror system according to claim 8 wherein the opening terminates in an inwardly-directed circumferential wall for registry with the catches when the pedestal is inserted into the opening.

10. A vehicular exterior rearview mirror system according to claim 9 wherein the circumferential wall is provided with at least two notches for registry with the catches when the pedestal is inserted into the opening.

11. A vehicular exterior rearview mirror system according to claim 7 and further comprising a biasing element for applying an outwardly directed force to at least a portion of the pedestal to urge the at least two detent ribs into the at least two detent channels.

12. A vehicular exterior rearview mirror system according to claim 11 wherein the biasing element is a tricrural detent spring.

13. A vehicular exterior rearview mirror system according to claim 11 wherein the biasing element is a C-ring.

14. A vehicular exterior rearview mirror system according to claim 11 wherein the biasing element is a helical ring.

15. A vehicular exterior rearview mirror system according to claim 1 wherein the pivot connection accommodates relative axial displacement of the one of the support arm relative to the base frame and the reflective element assembly relative to the support arm independent of the engagement of the detent ribs with the detent channels.

* * * * *